(No Model.)
E. BUEBEL & J. HALL.
DEVICE FOR LOCKING BICYCLES.
No. 594,724. Patented Nov. 30, 1897.
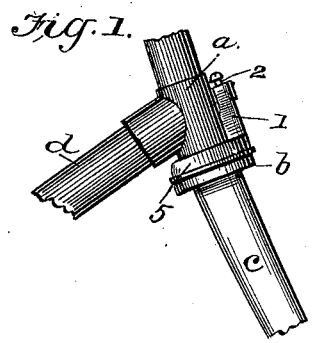
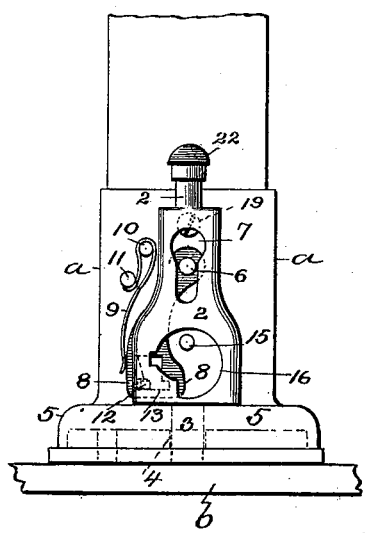
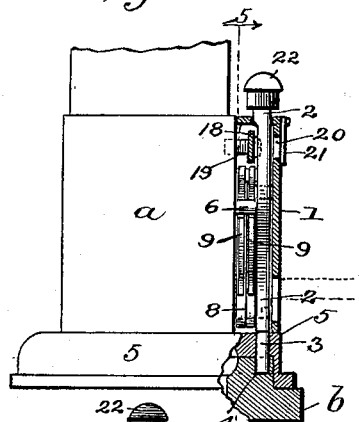
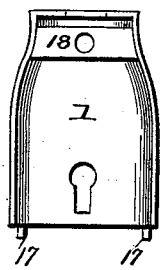
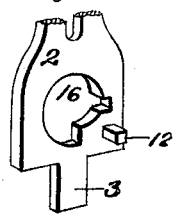
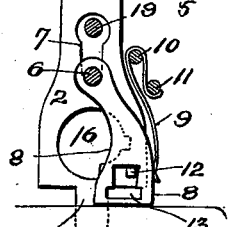
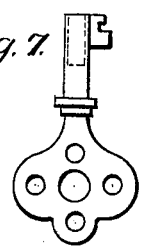
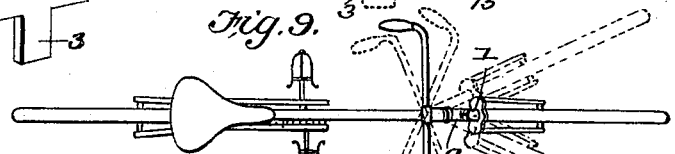
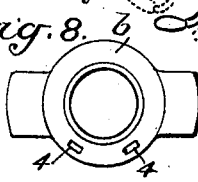
WITNESSES
Jos. A. Ryan
Amos W. Hart
INVENTORS
Emil Buebel
Jack Hall
BY Munn & Co.
ATTORNEYS

UNITED STATES PATENT OFFICE.

EMIL BUEBEL, OF ALTOONA, AND JACK HALL, OF JUNIATA KIPPLE, PENNSYLVANIA.

DEVICE FOR LOCKING BICYCLES.

SPECIFICATION forming part of Letters Patent No. 594,724, dated November 30, 1897.

Application filed July 12, 1897. Serial No. 644,354. (No model.)

*To all whom it may concern:*

Be it known that we, EMIL BUEBEL, of Altoona, and JACK HALL, of Juniata Kipple, in the county of Blair and State of Pennsylvania, have invented a new and useful Improvement in Devices for Locking Bicycles, of which the following is a specification.

Our invention is an improvement in the class of devices which are applied to the front fork of a bicycle for locking it, so that the front wheel cannot be turned to the right or left, thereby preventing use of the machine.

Our invention is embodied in a lock and the adaptation of the same to a bicycle, as hereinafter described, and shown in accompanying drawings, in which—

Figure 1 is a side view of a portion of the head of a bicycle, showing our improved lock applied thereto. Fig. 2 is an enlarged front view of the same without the cover or casing of our lock. Fig. 3 is an enlarged vertical section of the attachment. Fig. 4 is an inner side view of the casing of the lock. Fig. 5 is a vertical section on line 5 5 of Fig. 3. Fig. 6 is a perspective view of the lower portion of the locking-bolt. Fig. 7 is a side view of the key of the lock. Fig. 8 is a top end of the fork-crown. Fig. 9 is a diagrammatic view of a bicycle, illustrating the lateral angles at which the front wheel may be locked.

Our lock A is applied in Fig. 1 to the lower head-tube fitting $a$, which is adjacent to the crown $b$ of forks $c$, to which fitting the lower frame-tube $d$ is secured in the usual way. The locking device proper and other adjunctive parts are inclosed in a thin metal case or casing 1, Fig. 4, which is secured detachably to the fitting $a$, by means hereinafter described.

The locking-bolt 2, Figs. 2, 5, and 6, is arranged and adapted to slide vertically, and when in its uppermost position, Fig. 5, it leaves the front wheel of the bicycle free, as required for riding; but when depressed, as in Figs. 1, 2, and 3, its reduced lower end 3 enters a socket 4 in the cone or fork-crown bearing $d$, thus locking the fork $c$, so that the front wheel cannot be turned to the right or left. It will be observed that such reduced end 3 of the bolt 2 works and is guided in a hole in the upper cone-bearing 5. The upper portion of the bolt is guided vertically by a stud 6, which is fixed in the fitting $a$ and projects into a key-shaped slot 7 in the bolt 2. This same stud 6 also serves as a pivot or fulcrum for the pendent tumblers 8, which hold the bolt 2 in locking or unlocking position. Wire springs 9, Figs. 2, 3, and 5, are attached to studs 10 and 11, Figs. 2 and 5, so as to cause them to bear on the tumblers 8 and hold them in constant engagement with a pin or lug 12, Figs. 5 and 6, which projects inward from the lower end of bolt 2. The said tumblers have an irregular closed slot or opening 13, Fig. 5, to receive said lug 12. The outer side of such slot 13 is inclined and also provided with a shoulder, as shown.

The tumblers 8 being on a fixed pivot and the bolt 2 being adapted to slide vertically it is apparent that when the bolt is raised, as shown in Fig. 5, the pin 12 will hold or support it by friction with the inclined side of slot 13, so that it will not drop accidentally to the locking position; but when the tumblers 8 are thrown back by a key, say such as shown in Fig. 7, they being thus disengaged from said pin 12, the bolt 2 is free to be pushed down into locking position, as shown in Figs. 2 and 3, and the shoulders of the slot 13 in the tumblers 8 instantly reëngage the bolt-pin 12, and thus lock it until they are again acted on or retracted by the key. It will be seen that this engagement is effected by the pin 12, passing under the shoulder of bolt-slot 13.

The stud 15, Fig. 2, on which the key is rotated for operating the lock is fixed in the head-tube fitting $a$, and the broader lower portion of the bolt 2 is provided with an opening 16, having a shape suitable for engagement of the key for raising and depressing the bolt when the tumblers are forced laterally, as will be readily understood without further description.

The bolt-sockets 4, Fig. 8, are located on opposite sides of the center of the lower or fork-crown bearing $b$, and hence the front wheel can only be locked at an angle to the rear wheel, as shown by dotted lines in Fig. 9.

The casing 1 is provided, Fig. 4, with lugs 17 at its lower end which enter sockets in the bearing 5, and the upper portion of the casing has a transverse bar or plate 18, through which a screw 19, Figs. 2, 3, and 5, is inserted, the same entering a threaded hole or socket in the fitting a, Fig. 3. To insert the screw 19, the bolt 2 requires to be raised, so that the wider portion of the key-shaped slot 7 is opposite the head of the screw, as in Fig. 5. When the bolt 2 is depressed or in locking position, as in Fig. 2, the screw-head is concealed and inaccessible to a screw-driver inserted through the hole 20 in the case. (See Fig. 3.) Such hole 20 is normally covered by a pivoted drop-plate 21, which excludes dust.

The head 22 of bolt 2 is made detachable to facilitate application and detachment of the casing 1.

What we claim is—

1. The combination, with a bicycle-fork, crown having recesses in its upper side, and the lower fitting forming a rigid attachment of the head-tube, of the improved lock comprising the slidable bolt having a reduced lower end and key-opening as shown, and a laterally-projecting pin, spring-actuated tumblers arranged flatwise with said bolt, and having a slot for securing the bolt-pin, a casing adapted to fit over the lock proper and secured to the aforesaid fitting, also provided with an opening at the top through which the bolt-head projects, and a key-stud fixed in said fitting, and projecting into the bolt-opening, all arranged and operating as shown and described.

2. In the bicycle-lock described, the slidable bolt having the key-shaped slot 7, the lock-casing having the hole 20, and a bridge-piece 18, provided with the hole, which is coincident with said hole 20, the screw 19, passing through the bridge-piece and securing said casing to the fitting of the head-tube, the said slot 7 in the bolt being arranged as described, relative to the said screw and holes in the casing, whereby, when the bolt is in locking position, the head of the screw is covered by it and thus inaccessible, as shown and described.

E. BUEBEL.
J. HALL.

Witnesses:
C. A. ANDERSON,
THOMAS SHAW.